Feb. 4, 1964     K. D. BROWN     3,120,401

FITTING

Filed June 13, 1960     2 Sheets-Sheet 1

INVENTOR.
Kenard D. Brown
BY
ATTORNEYS

Feb. 4, 1964  K. D. BROWN  3,120,401
FITTING
Filed June 13, 1960  2 Sheets-Sheet 2
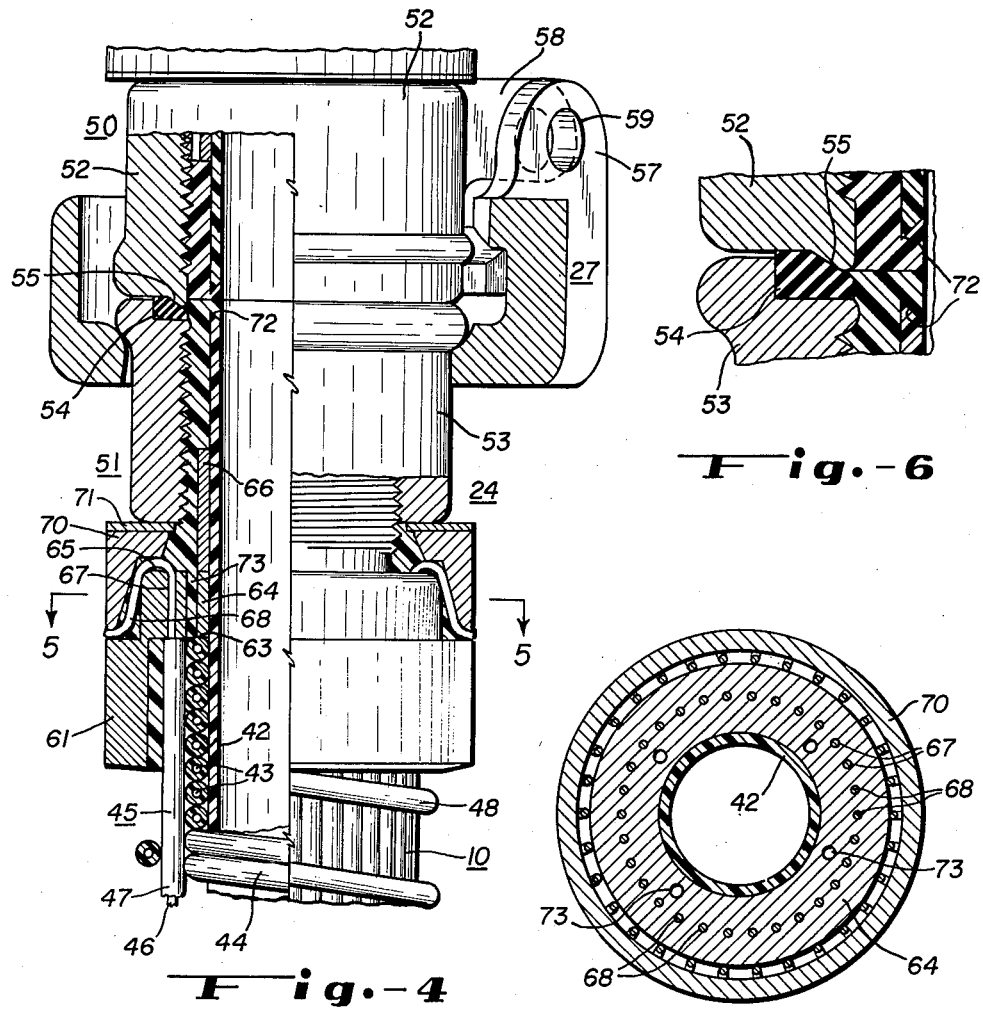
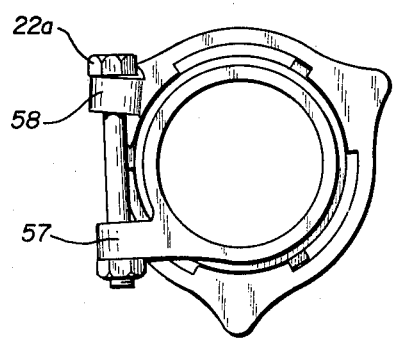
INVENTOR.
Kenard D. Brown
BY
ATTORNEYS

United States Patent Office 3,120,401
Patented Feb. 4, 1964

3,120,401
FITTING
Kenard D. Brown, Denver, Colo.
(3535 Teller St., Wheatridge, Colo.)
Filed June 13, 1960, Ser. No. 35,728
5 Claims. (Cl. 285—149)

This invention relates to flexible tubing, rods and other elongated flexible elements which are required to be used under tensional stress, and particularly to terminal fittings and couplings for such elements.

Flexible rods, tubing and similar elements are required to be used under tension in many applications. For example, flexible tubing and sucker rods for use in oil well drilling and other operations are required to withstand high tensional stress when great lengths of the rod or tubing are introduced into a well, particularly when they are required to carry heavy tools or other equipment. Furthermore, it is necessary that these rods and tubes withstand stress brought about by the sticking or catching of the equipment during withdrawal from the well. An example of a flexible tubing and rod construction for carrying loads in tension is that described and claimed in my copending application Serial No. 831,260, filed August 3, 1959; in that construction longitudinal tension wires are employed to facilitate the carrying of heavy tension loads on the tubing or rod.

It is an object of the present invention to provide an improved terminal fitting for flexible rods and tubing of the tension load carrying type.

It is another object of this invention to provide an improved coupling assembly for connecting flexible tubing of the tension load carrying type.

Briefly, in carrying out the objects of this invention in one embodiment thereof a terminal fitting is provided which comprises a rigid metal sleeve having an internal diameter sufficiently large to receive the end of a reinforced flexible tube of the type having a plurality of longitudinal tension wires; the sleeve is formed to provide a shoulder portion over which portions of the tension wires are bent and locked to prevent their removal from the fitting. The fitting is provided with a plurality of longitudinal holes extending about the shoulder portion in which parts of the wires are anchored to locate the bent portions in spaced relationship. A clamping member is employed which compresses the bent portions against the shoulder for locking purposes and the wires, fitting and tubing are further bonded together by a solidified potting compound filling the spaces throughout the interior of the fitting.

In another embodiment terminal fittings are provided for flexible tubing having longitudinal tension wires anchored in a rigid sleeve in a manner similar to the first embodiment; the ends of the fitting are filled flush with the potting material to provide a flat sealing face about the central tube opening. Two such fittings may then be locked together by any suitable clamping means for compressing the flush sealing areas in pressure engagement. This sealing effect may be supplemented by a conventional gasket arranged outside the plastic sealing face of one of the fittings.

The features of novelty which characterize this invention are pointed out with particularity in the claims annexed to and forming a part of this specification. The invention itself, however, both as to its organization and method of operation may best be understood from the following description taken in connection with the accompanying drawings, in which:

FIG. 4 is an enlarged view partly in section of the coupling assembly of FIG. 1;

FIG. 5 is a sectional view taken along the line 5—5 of FIG. 4;

FIG. 6 is an enlarged fragmentary section illustrating the sealing arrangement between the complementary sleeve fittings; and FIG. 7 is a top plan view of the clamping assembly shown in FIGS. 1 and 4 with contained parts omitted.

Figure 1:
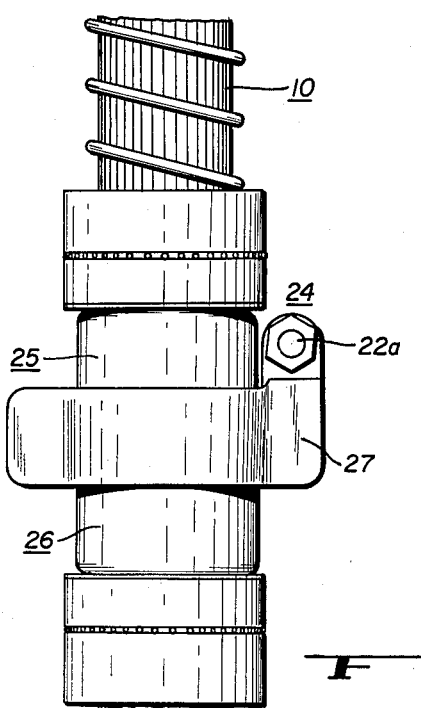
FIG. 1 is an elevation view partly broken away showing a flexible tubing and flexible sucker rod assembled with an oil well pump and employing fittings embodying the invention.

Referring now to the drawings, the tubing and rod assembly illustrated comprises a reinforced flexible tubing 10 and a flexible sucker rod 11 inside the tubing and connected by a fitting 12 to a well pump operating plunger 13. The tubing 10 is the supply line for discharging pumped oil to the surface. The tubing is secured to the discharge connection of the pump by a coupling 14 which includes rotary clamping members 15 and 16 provided with interfitting cams which press a fitting 20 on the pump into secure engagement with a fitting 21 at the lower end of the flexible tubing 10, the clamping being effected by tightening a bolt 22. Clamps of this type are available on the market and the details of construction are not essential to an understanding of the present invention, and portions thereof have been omitted for purposes of clarity as in FIG. 7. In some installations it may be desirable to join two or more sections of flexible tubing, and for this purpose a coupling assembly such as illustrated at 24 may be employed. This assembly includes upper and lower fitting members 25 and 26 and a clamping ring 27 of the same construction as the clamp comprising the members 15 and 16 of the assembly 14.

Figure 2:
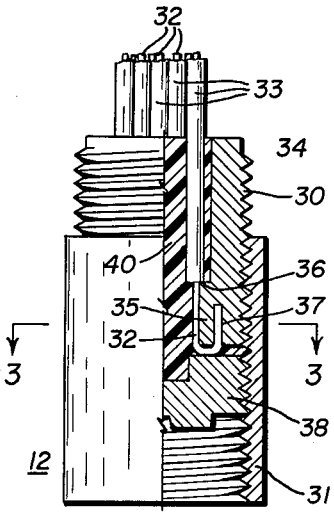
FIG. 2 is an enlarged view partly in section showing the sucker rod fitting employed in FIG. 1.
Figure 3:
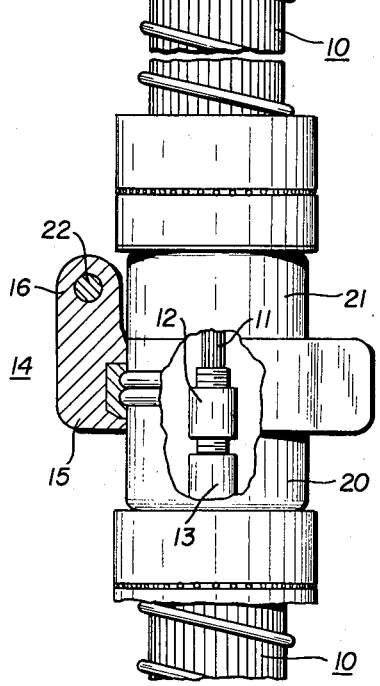
FIG. 3 is a sectional view taken along the line 3—3 of FIG. 2.
Figure 3:
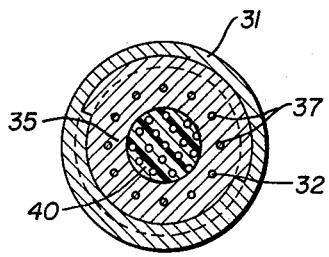

The details of construction of the fitting 12 are shown in FIGS. 2 and 3. The fitting 12 as shown comprises a main sleeve or body portion 30 and an outer adapter 31 threaded onto the body 30. A flexible sucker rod comprising a multiplicity of tension wires 32 covered with plastic envelopes 33, which are bonded securely thereto, extends into a central recess 34 in the body 30. The sleeve 30 is provided with an internally extending annular portion 35 which forms an internal shoulder 36; the plastic or insulation 33 is removed from the wires 32 so that the bare ends of the wires extend from the shoulder 36 around the annular portion 35 and are bent around and back into a plurality of longitudinally extending holes 37 which thus anchor the wires and hold them in spaced relationship to one another. In FIG. 2 of the drawings, only one of the tension wires has been shown extending into the opening 34 and secured in position, others having been omitted for the sake of clarity. The wires are securely locked in position by a pressure block or plug 38 which is threaded into the adapter 31 and tightened to compress the bent ends of the wires 32.

The entire space within the sleeve 30 and extending about the wires and the insulated portions thereof is filled with a solidified potting material 40, this material being poured into the sleeve 30 as a liquid, filling the sleeve. When the potting compound has solidified the entire assembly is bonded rigidly together and the wires are further locked into place. The adapter 31 extends beyond the pressure block 38 so that it may be threaded onto the pump plunger 13 as shown in FIG. 1.

The fitting of the tension wires 32 into the sleeve 30 and the manner in which they are locked by the mechanical pressure of the block 38 against the bent ends of the wire, together with the solid bonded assembly formed by the potting compound, provides a fitting in which the tension wires are securely held and assures even distribution of the tension load among the wires.

The details of construction of the coupling assembly 24 are shown in FIGS. 4 and 5. As shown in these figures, the flexible tubing 10 comprises a smooth-walled internal tube 42 which is preferably constructed of a synthetic resin, for example, polyethylene and nylon, which is selected to minimize the deposit of paraffins on the wall of the tube. The tube is reinforced by a helical wrapping of steel wires 43 covered with polyethylene or other suitable plastic material 44, the turns of the wrapping being in contact with one another and being wound to a smaller diameter than the tube so that they grip the tube.

Outside the helical wire components there are provided a plurality of longitudinal tension members or elements 45 comprising steel wires 46 covered with plastic material 47 the same as the material 44. In order to retain the tension members or elements 45 in position about the reinforced tubing, a long-pitch helical wire element 48 is wrapped about the tension members 45, the element 48 also comprising a steel wire covered with polyethylene or similar material. The tubing constructed in this manner is that disclosed and claimed in my above-mentioned copending application.

The coupling assembly 24 comprises two similar fittings indicated at 50 and 51. These fittings are of essentially the same construction except that the fitting 50 includes a compression coupling element or sleeve 52 and the coupling 51 a similar sleeve 53. These sleeves are complementary, the sleeve 53 being provided with a sealing gasket 54 secured in a shoulder or recess within the end of the fitting and the sleeve 52 being provided with a rim or shoulder 55 for compression against the gasket 54. The remaining differences in construction of the sleeves 52 and 53 are minor and are provided for cooperation with the clamping rings of the assembly 27, the two rings being indicated at 57 and 58 and being arranged to be urged together by relative rotation and camming action upon tightening of a bolt 22a passing through openings in lugs formed on the rings, the opening for the ring 57 being shown at 59.

The fitting 50, which serves to illustrate the construction of both fittings except for the minor differences discussed above, comprises a main body portion or sleeve 61 having a cylindrical recess 62 in which the reinforced end of the tubing 10 is inserted except for the outer helical wrapping 48 and extends up to a shoulder 63 formed in a portion 64 of reduced internal diameter. The external diameter of the sleeve 61 is also reduced to form a shoulder 65 and a threaded extension 66. The internal diameter of the reduced portion 64 is such that it fits closely about the tube 42 where it extends beyond the longitudinal portion.

A plurality of longitudinally extending holes 67 are provided in the reduced diameter portion and extend between the shoulders 63 and 65. These holes accommodate end portions 68 of the wires 46 from which the insulation 47 has been removed. The ends of the wires 46 after passing through the holes 67 are bent around the shoulder 65 and are then compressed against the shoulder by a ring 70 which is forced against the wires by screwing the coupling sleeve 52 over the threaded portion 66 tightly against a friction washer 71 and thus against the ring 70. This compresses the ends of the wires securely between the body 61 and the ring 70 and locks them in position, the wires being held in the required spaced relationship by the spacing of the holes 63 substantially in a ring about the sleeve 61.

The tube 42 extends slightly short of the end of the fitting sleeve 52 and is inwardly beveled as indicated at 72. The entire interior space of the fitting is filled with potting compound, such as epoxy resin, which bonds all the elements rigidly in place and seals the metal surfaces from corrosion. In order to fill the fitting in the required manner, a suitable dam is positioned across the end of the sleeve 52 and inwardly to close the axial gap to the inner wall of the tube 42. The fitting is then placed upright with the open end of the sleeve 52 at the bottom and liquid potting compound is poured in around the reinforcing wires and reaches the openings about the bent portions of the wires 46 through a plurality of passages 73 drilled through the reduced portion 64 to provide communication between both ends of the portion and through the side adjacent the ring 70.

After the potting material fills all the spaces, it is allowed to harden and the dams formed about the end of the fitting 52 are then removed. This provides a flush sealing face about the end of the fitting 52 and also bonds the beveled end 72 of the tube 42 securely in position and prevents loosening of the tube at the end.

As stated before, the fitting 51 is similarly constructed, and when the two fittings are forced together by the clamping assembly 27 the sealing faces are pressed securely into engagement and provide a smooth internal connection between the tubes and the two fittings. This sealing engagement of the plastic faces is further supplemented by a compression of the gasket 54 by the sealing rim 55.

The sucker rod fitting and the tube fittings as described above provide secure terminal connections for rods, tubing and the like of the type provided with longitudinal tension elements and required to withstand high tensile stress.

While the invention has been disclosed in connection with specific forms of flexible rods and tubing, various other applications and modifications will occur to those skilled in the art. Therefore, it is not desired that the invention be limited to the particular embodiments illustrated and described and it is intended by the appended claims to cover all modifications which fall within the spirit and scope of the invention.

I claim:

1. A tension load coupling fitting for flexible tubing rod or similar elements of the type having a plurality of individual tension wires extending longitudinally thereof, said fitting comprising a metal sleeve having an inwardly extending annular shoulder provided with a plurality of longitudinally extending holes of substantially the same diameter as the tension wires arranged substantially in a circle about the center of the sleeve, there being one hole for each wire, a plurality of the tension wires of the element extending from the end thereof and having portions in said holes, each wire being placed individually into its respective hole and bent portions of the wires extending over said shoulder on the side remote from the element, means threadedly engaging said sleeve and abutting the bent portions of the wires for compressing the bent portions of said wires between opposing faces of said means and said sleeve to individualy lock said wires in said sleeve, and a mass of potting compound within said sleeve solidified about the end of said element therein.

2. A coupling fitting as set forth in claim 1 for tubing rods or similar elements wherein the tension wires are covered with insulating material and wherein the holes in said shoulder are of a size to accommodate the tension wires with the insulation removed, the ends of the wires being scraped to remove insulation for passage through the holes and the portions of the wires within the sleeve outside the holes having the insulation thereof securely bonded to the potting compound.

3. A terminal fitting for flexible tubing of the type comprising a tube of flexible plastic material having reinforcing wires and longitudinal tension wires arranged thereabout, said fitting comprising a rigid sleeve fitting over said tubing and having a portion of reduced internal and external diameter providing an internal shoulder and an external shoulder, the external wall of said reduced portion being threaded and the internal bore thereof being smooth and closely fitting a portion of said plastic tube extending beyond said reinforcing wires, said fitting having longitudinal holes arranged in a circle about said shoulders and extending therebetween, the ends of said tension wires passing through the holes and being bent outwardly over said external shoulder, a collar fitting over said external shoulder, an internally threaded member engaging the threads of said reduced portion and compressing said collar against said wires and said wires against said external shoulder to lock said wires in position, and a solidified potting compound filling the spaces within said fitting about said tube and wires, said threaded member and tube extending beyond said reduced portion in spaced relationship and the space therebetween being filled with said potting compound lying substantially flush with the end of said sleeve.

4. A terminal fitting as set forth in claim 3 including additional passages extending from the face of said internal shoulder to the space between said threaded member and said tube beyond said reduced portion for the free flow of the potting compound prior to solidification.

5. A fitting as set forth in claim 3 wherein the outer end of said tube lies a short distance within said threaded member and is beveled inwardly and wherein said potting compound extends over the beveled end of said tube and constitutes a continuation of the internal wall of said tube and lies substantially flush with the end of said threaded member whereby said compound locks the end of said tube securely in position in said threaded member.

References Cited in the file of this patent
UNITED STATES PATENTS

| | | |
|---|---|---|
| 471,266 | Buscher | Mar. 22, 1892 |
| 1,408,212 | Leinbach | Feb. 28, 1922 |
| 2,035,088 | McNamee | Mar. 24, 1936 |
| 2,473,441 | Muller | June 14, 1949 |
| 2,610,869 | Allison | Sept. 16, 1952 |
| 2,753,197 | Loeffler | July 3, 1956 |
| 2,787,917 | Schroeder | Apr. 9, 1957 |
| 2,884,477 | Trickle | Apr. 28, 1959 |
| 2,940,778 | Kaiser | June 14, 1960 |

FOREIGN PATENTS

| | | |
|---|---|---|
| 42,248 | Sweden | June 4, 1919 |